US010070203B2

(12) United States Patent
Busslinger

(10) Patent No.: US 10,070,203 B2
(45) Date of Patent: Sep. 4, 2018

(54) MEASUREMENT DEVICE AND METHOD FOR TELEMETRIC TRANSMISSION OF MEASUREMENT DATA FROM A MEASUREMENT UNIT ON A MOBILE SYSTEM TO A BASE STATION

(71) Applicant: KISTLER HOLDING AG, Winterthur (CH)

(72) Inventor: Bruno Busslinger, Marthalen (CH)

(73) Assignee: KISTLER HOLDING AG, Winterthur (CH)

( * ) Notice: Subject to any disclaimer, the term of this patent is extended or adjusted under 35 U.S.C. 154(b) by 0 days.

(21) Appl. No.: 15/308,672

(22) PCT Filed: Apr. 23, 2015

(86) PCT No.: PCT/CH2015/000061
§ 371 (c)(1),
(2) Date: Nov. 3, 2016

(87) PCT Pub. No.: WO2015/176189
PCT Pub. Date: Nov. 26, 2015

(65) Prior Publication Data
US 2017/0223433 A1   Aug. 3, 2017

(30) Foreign Application Priority Data

May 22, 2014 (CH) ........................ 785/14

(51) Int. Cl.
*G06F 3/044* (2006.01)
*H04Q 9/00* (2006.01)
(Continued)

(52) U.S. Cl.
CPC ........... *H04Q 9/00* (2013.01); *H04Q 2209/40* (2013.01); *H04W 84/18* (2013.01); *H04W 88/08* (2013.01)

(58) Field of Classification Search
None
See application file for complete search history.

(56) References Cited

U.S. PATENT DOCUMENTS

2006/0085092 A1* 4/2006 Redecker ............. B23Q 1/0009
700/175
2009/0322518 A1* 12/2009 Liang ...................... H04L 45/48
340/539.18

(Continued)

FOREIGN PATENT DOCUMENTS

| DE | 100 12438 A1 | 9/2001 |
| EP | 1 323 495 a1 | 7/2003 |
| WO | WO 2010/009906 A1 | 1/2010 |

OTHER PUBLICATIONS

International Search Report, dated Jul. 2, 2015.

*Primary Examiner* — Muhammad N Edun
*Assistant Examiner* — Jerold Murphy
(74) *Attorney, Agent, or Firm* — Dority & Manning, P.A.

(57) ABSTRACT

A device for telemetric transmission of measurement data in a work space that includes a base station arranged in a stationary manner and a measurement unit attached fixedly to a system that moves within the work space. A sensor for receiving measurement signals can be attached to or integrated in the measurement unit. The measurement unit also includes an electronic unit having a first processor, a first telemetric unit, and a first antenna for sending measurement data and for receiving configuration and control data. The base station includes a data processing unit, a second antenna and a second telemetric unit for receiving the measurement data and for sending configuration and control data. One of the antennas is linearly polarized, and the other antenna is circularly polarized. A method is provided for the measurement unit to receive measurement signals.

15 Claims, 1 Drawing Sheet

(51) Int. Cl.
  *H04W 84/18* (2009.01)
  *H04W 88/08* (2009.01)

(56) References Cited

U.S. PATENT DOCUMENTS

| | | | |
|---|---|---|---|
| 2011/0122024 A1 | 5/2011 | Eidloth et al. | |
| 2014/0188353 A1* | 7/2014 | Baker | B60W 40/13 |
| | | | 701/53 |
| 2015/0061947 A1* | 3/2015 | Manry, Jr. | H01Q 1/22 |
| | | | 343/720 |

* cited by examiner

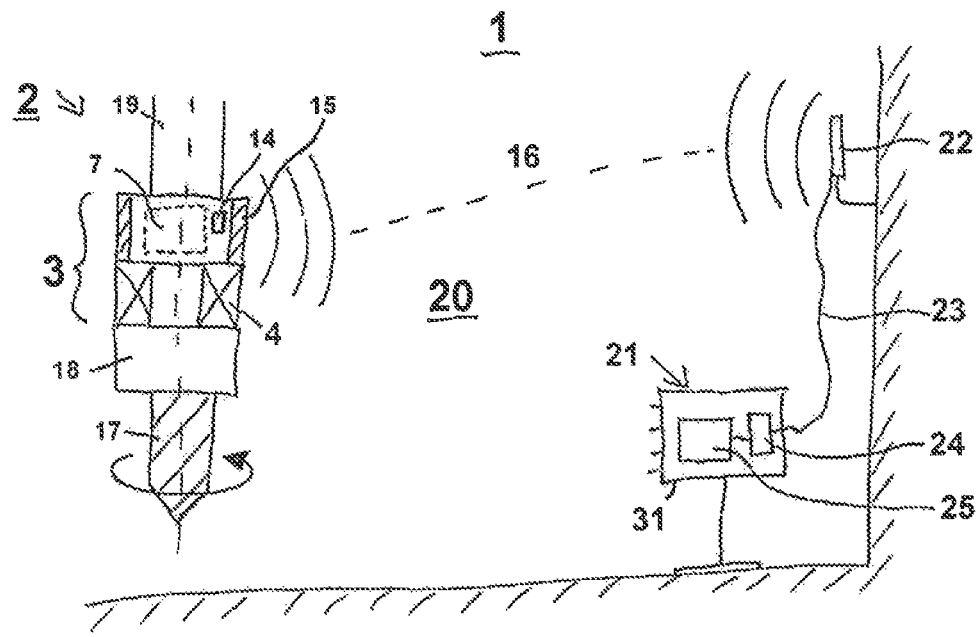
Fig. 1
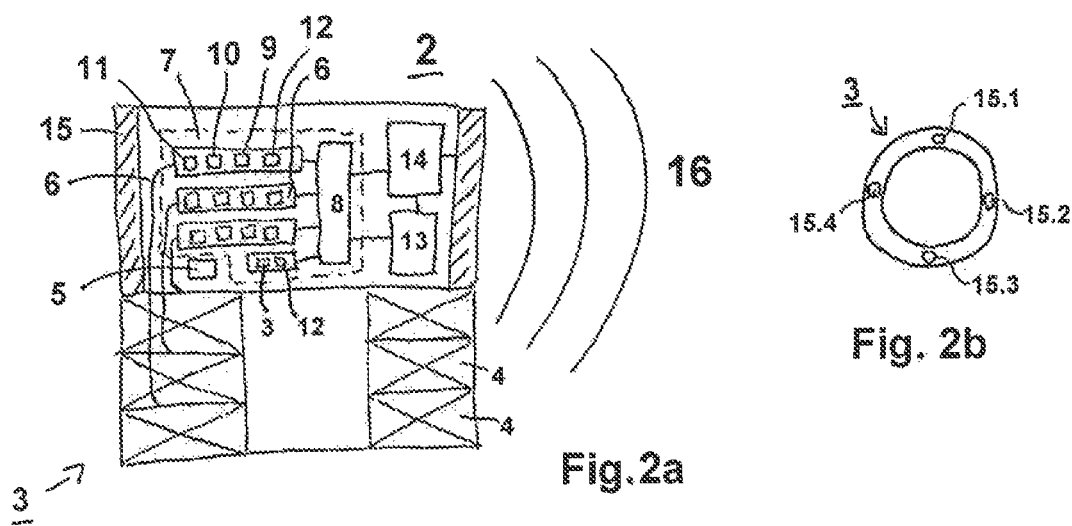
Fig. 2a
Fig. 2b
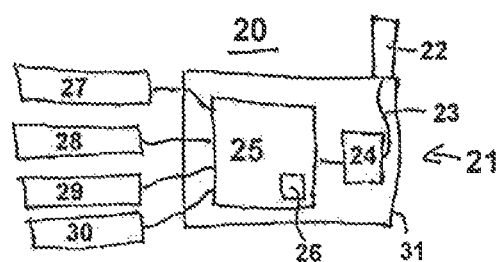
Fig. 3

MEASUREMENT DEVICE AND METHOD FOR TELEMETRIC TRANSMISSION OF MEASUREMENT DATA FROM A MEASUREMENT UNIT ON A MOBILE SYSTEM TO A BASE STATION

CROSS-REFERENCE TO RELATED APPLICATIONS

This application claims priority to International Application Serial No. PCT/CH2015/000061, filed Apr. 23, 2015, which claims priority to Swiss Application No, 758/14, filed May 22, 2014. International Application Serial No. PCT/CH2015/000061 is hereby incorporated herein in its entirety for all purposes by this reference.

FIELD OF THE INVENTION

The invention relates to a device comprising a measurement unit and a base station, and to a method for receiving measuring signals by means of the measurement unit and for telemetric transmission of measurement data to the base station wherein for a measurement the base station is arranged in a stationary manner in a work space and the measurement unit is fixedly mounted on a system that moves within said work space.

BACKGROUND

The transmission of measurement data from a moving system to a base station that is stationary in a working space is often difficult since it is often impossible to run cables or these may break easily because of the continuous movement. As said moving systems are considered rotating or turning systems but also those performing a back-and-forth translational motion while said motion always occurs within the work space, such as for example a robot which constantly moves back and forth with an arm to perform a task. Systems that move away in one direction such as vehicles or persons on the way and moving away from a work space are not considered by the present invention but only those for which the motion occurs in a defined area, especially within the work space. In particular, systems are taken into account the movements of which are defined and predetermined.

Thus, the systems considered herein may move relative to the base station, however, they may not significantly change their distance to the base station. Besides methods for transmission using sliding contacts in rotating systems transmission using telemetry has proven particularly effective. Examples of applications are rotating tool systems in which, for example, the cutting force of a cutting edge is to be determined, turbines, rollers or vehicle wheels. While in most applications the base stations are arranged in a work space which itself is stationary, the work space may also be a combination of vehicles for the determination of the wheel forces of vehicle wheels. Although the base stations are moving during a measurement, they are stationary within their respective work area. Therefore, the base stations in this example do not perform the same motion as do the corresponding measurement units.

A known measuring device of the type explained above is described in EP1323495. This document describes a method for monitoring tools on a spindle by means of a sensor device wherein the captured measurement data are transferred in a contactless manner to a stator which forwards them to a main processor. In addition, range changes can be carried out at the sensor device by sending appropriate commands in a contactless manner from the main processor via the stator to a microprocessor of the sensor device.

A disadvantage of the arrangement described above is the fact that contactless transmission is performed by means of near field telemetry. For this purpose, it is necessary to arrange a stator in each case in the close vicinity, i.e. at a distance of a few millimeters. In many systems, in particular with rotating tools and robots employed in material machining or in assembly in industrial companies, for example, this has proven disadvantageous.

BRIEF SUMMARY OF THE INVENTION

Accordingly, it is an object of the present invention to provide a device and method of the type described in the beginning for receiving measuring signals at a moving system for transferring measurement data wherein no stator has to be arranged in the close vicinity of the measurement unit in order to transmit the data by means of near field telemetry. In addition, it shall be ensured that contactless and interference-free data transfer with sufficient signal strength is achieved.

The objects are achieved by a device having the features described below as well as by a method having the features described below. Preferred embodiments are described in the text that follows.

To achieve the object, a device as described in the beginning is used wherein the measurement unit comprises at least one or more measuring channels to which one or more sensors for detecting measuring signals can be connected or are connected, respectively. In addition, the measurement unit comprises an electronic unit having a first processor for conditioning and/or compressing the measured signals into measurement data, a first telemetry unit, and a first antenna. The first antenna can send measurement data and preferably also status information and can receive configuration and control data. The base station comprises a data processing unit as well as a second antenna and a second telemetry unit for receiving measurement data and preferably status information and for sending configuration and control data.

According to the invention, the first antenna is a linearly polarized antenna and the second antenna is a circularly polarized antenna or vice versa. Accordingly, in the method according to the invention, the first antenna linearly polarizes the measurement data and the second antenna circularly polarizes the configuration and control data or vice versa when telemetric transmission is carried out.

It has been found that in conventional antennas the arrangement of the antennas with respect to each other is critical to ensure interference-free transmission of data with sufficient signal strength. In near field transmissions with predetermined and fixed positions of the antennas relative to each other the transmission quality is not compromised. In far field telemetry, however, there is an increased risk for so-called fading, i.e. interference with other radio services, shadowing, multipath propagation and Doppler effect, to occur due to the movement. Furthermore, the signal is weakened noticeably when persons are moving around in the space between the transmitting and receiving antennas. Further problems are caused by reflections of the signals in space.

The least losses are obtained in cases where the transmitting and receiving antennas are similar. Hence, this is the case if the antennas are both horizontally or both vertically linearly polarized, or if both are circularly dextrorotatory or circularly levorotatory. In each of these cases no losses are obtained if there is direct transmission.

With horizontally and vertically linear antennas, however, the signals are decreased once the antennas are no longer arranged in parallel. This is the case, for example, during movement of a machine tool to which the moving system is attached. The signal strength is decreased down to a theoretical value of zero when the antennas are perpendicular to each other. In practice, a signal loss of 20-30 dB is seen. On the other hand, a circularly dextrorotatory signal is converted into a circularly levorotatory signal after it has been reflected on a wall. Also in this case, the circularly levorotatory signal that can be received at the circularly dextrorotatory antenna is decreased by 20-30 dB.

It has now been found that a mixed form of antennas ensures stable data transmission. Thus, if one of the two antennas is a (horizontally or vertically) linearly polarized antenna and the other is a circularly (dextrorotatory or levorotatory) antenna, the loss is 3 dB corresponding to half of the maximum signal strength. This loss in signal can be compensated for by doubling the power of the transmission antenna. In this case, it is insignificant whether and how often the signal is reflected on a wall. It is equally irrelevant in which way the antennas are arranged to one another. In addition, other interfering factors and fading have minimal impact. It has been shown that with the combination of linearly and circularly polarized antennas the signal transmission is stable in both directions, even though reduced by 3 dB.

BRIEF DESCRIPTION OF THE DRAWINGS

In the following, the invention will be explained in more detail with respect to the drawings in which FIG. 1 shows a schematic representation of a measurement device in an application example;

FIG. 2a shows a measurement unit according to the invention;

FIG. 2b shows an arrangement of individual antennas around the measurement unit;

FIG. 3 shows a base unit according to the invention.

DESCRIPTION OF EXEMPLARY EMBODIMENTS OF THE INVENTION

FIG. 1 shows an example of a device according to the invention comprising a measurement unit 3 and a base station 21 for receiving measuring signals by the measurement unit 3 and for telemetric transmission of measurement data to the base station 21 wherein for a measurement the base station 21 is stationary in a defined work space 20 and the measurement unit 3 is fixedly mounted on a system 2 that moves within said workspace 20.

Usually, the moving system 2 is associated with and does not leave the work space 20 during a measurement. In particular, an industrial building or an industrial plant, a tool storage, an assembly hall, a fabrication plant or the like may be considered as the work space 20 while the system 2, for example a tool or a robot, may perform a translational and/or rotary motion within this workspace 20. However, the work space 20 itself may also be mobile relative to an additional frame of reference that differs from the system 2. In such a case, for example the work space 20 may take the form of a vehicle, wherein during a measurement the system 2 moves relative to the work space 20, such as for example a wheel of such vehicle, which may move relative to the roadway. In this case, the base station 21 is mounted in or on the vehicle while the measurement unit 3 is mounted on the vehicle wheel.

The measurement unit, as shown in more detail in FIG. 2a, comprises at least one or more measuring channels 6 to which one or more sensors 4 for receiving measuring signals may be connected or are connected, and an electronic unit 7 having a first processor 8 for conditioning and/or compressing the measuring signals into measurement data. The processor 8 also means a programmable logic and/or a combination of processors and logic. In addition, the measurement unit 3 comprises a first telemetry unit 14 and a first antenna 15 for transmitting measured data and for receiving configuration and control data. Preferably, also status information is sent from the first antenna 15. The first antenna 15 can be combined from several individual antennas 15.1-15.4 uniformly distributed around the measurement unit 3. FIG. 2b shows an example with four such individual antennas 15.1-15.4.

The base station 21 is shown in more detail in FIG. 3 and comprises a second antenna 22 and a second telemetry unit 24 for receiving measurement data and for sending configuration and control data. Status information transmitted from the first antenna 15 is also received by the second antenna 22. In addition, the base station 21 also comprises a data processing unit 25.

As shown in FIG. 1, the second antenna 22 may be arranged separately from the rest of the base station 21 to which it may be connected via a connection 23. However, it can also be mounted on or in the base station 21, as shown in FIG. 3.

According to the invention, the first antenna 15 is a linearly polarized antenna and the second antenna 22 is a circularly polarized antenna or vice versa. Preferably, the first antenna 15 is a linearly polarized antenna and the second antenna 22 is a circularly polarized antenna. This is due to the typical geometry and dimensions of the respective antennas. Thus, the smaller antenna is preferably mounted on the moving system. However, this is not critical for the quality of transmission. Both antennas 15, 22 are transmitters and receivers of far field telemetry 16, for example in the range of between 400 MHz and 70 GHz.

The example represented in FIG. 1 shows a particular application example of a rotating tool 17 mounted on a tool holder 18 on a shaft 19 together forming a moving system 2 to which the measurement unit 3 is attached. Other examples of moving systems to which the measurement unit 3 according to the invention may be attached include turbines, particularly of power plants, for example hydroelectric or wind turbines, shafts of any kind, rollers, in particular of metal and paper processing plants, wheels of vehicles, for example of rail vehicles or motor vehicles, or robots, for example those used in industrial companies for the manufacture or assembly of parts. Although in contrast to other examples mentioned herein, such robots do not move constantly around a predetermined axis but predominantly perform a translational motion, it is often impossible to connect measurement units mounted thereon to a base station in the work space via data cables without risking breakage of such cables after a short time.

In a preferred embodiment, the measurement unit 3 comprises one or more sensors 4, 5. These are in particular configured as force, pressure, torque, feed force, bending moment, strain, vibration, acceleration and/or temperature sensors. Therefore, it is advantageous if the sensor 4, 5 is a piezoelectric or piezoresistive sensor, a strain gauge or a thermocouple. Accordingly, one or more measuring channels 6 are provided for the processing of measuring signals derived from piezoelectric and/or piezoresistive sensors 4, 5, strain gauges and/or thermocouples. In particular, multi-dimensional sensors 4 may be used that can measure forces in all three orthogonal directions or combinations of forces, moments strains, thrust and/or temperature, for example. As shown in FIG. 2a for example, the sensors 4, 5 themselves may be integrated into the measurement unit 3. Alternatively, the sensors 4, 5 may be optionally connected thereto.

Each channel of a sensor 4, 5 should be connected to a separate measuring channel 6 as shown in FIG. 2a. Preferably, each measuring channel 6 of the measurement unit 3 comprises an AD converter 9 for digitizing the measured data. Furthermore, individual or all measuring channels 6 may comprise a range switch 10 for adjusting the measuring range wherein the configuration of each range switch may be performed from the base station by telemetry. Some measuring channels 6 additionally comprise a reset function 11 for resetting the measuring channel 6, and/or a start/stop function 12 for starting and stopping a measurement wherein all functions 11, 12 can be controlled from the base station 21 by telemetry. However, the measurement unit 3 may also comprise other sensors 5 which do not require a range switch 10, such as for example temperature sensors 5.

In addition, as shown in FIG. 2a for example, the measurement unit 3 comprises a power generation system and/or an energy storage unit 13, in particular a large-capacity capacitor and/or a rechargeable or non-rechargeable battery for powering the electronic unit and the first telemetry unit 14. The power generation system may be a system capable of generating power on the basis of movement or a temperature difference to which the measurement unit 3 is subjected. Energy may also be transmitted to the measurement unit 3 by means of telemetry.

Furthermore, the measurement unit 3 provides information regarding its status. This may particularly include the state of charge of an energy storage unit 13, range settings and other data including sensor-specific data such as sensor sensitivities.

The data processing unit 25, also shown in FIG. 3, comprises a second processor 26 for analyzing the measurement data as well as for telemetric evaluation, configuration, operation and control of the measurement unit. Preferably, the second telemetry unit 24 together with the data processing unit 25 is accommodated by a housing 31 on which or in which the second antenna 22 is mounted. The data processing unit 25 preferably comprises at least one interface to a user 27, a controller 28, an evaluation unit 29 and/or a memory unit 30. The second processor 26 may be programmed to autonomously trigger range switchings, reset functions and start/stop commands.

In the method of the invention, a device 1 according to one of the above-described embodiments is used. According to the method of the invention for receiving measuring signals by means of the measurement unit 3 and for telemetric transmission of measurement data to the base station 21, said base station 21 is stationary within the work space 20 and the measurement unit 3 is fixedly attached to a system 2 that is mobile within workspace 20.

The measurement unit 3 first detects the measuring signals by the at least one sensor 4, 5 connected to one or more measuring channels 6. Then, by means of the first processor 8, the electronic unit 7 conditions and/or compresses the measuring signals into measurement data, which are transmitted by means of the first telemetry unit 14 and the first antenna 15. In the same work space 20, via the second antenna 22 and the second telemetry unit 24, the base station 21 receives the measurement data that are processed in the data processing unit 25. In addition, configuration and control data are sent from the second telemetry unit 24 via the second antenna 22 to the first antenna 15 and to the first telemetry unit 14.

According to the invention, during a telemetric transmission the measurement data and any other data are linearly polarized by the first antenna 15 and the configuration and control data are circularly polarized by the second antenna 22 or vice versa. Preference is given to the former option.

Preferably, the measuring signals are digitized in an AD converter 9 within the measurement unit 3. Furthermore, in a preferred method, the data processing unit 25 configures a range switch 10 of one or more measuring channels 6 by means of telemetry 16. In another preferred method, the data processing unit 10 preferably starts and/or stops and/or resets at least one measurement in at least one measuring channel 6 of the measurement unit 3 via telemetry by means of the start/stop function 12 or the reset function 11, respectively.

LIST OF REFERENCE NUMERALS 1 device for measuring, measurement device
2 moving system
3 measurement unit
4 sensor
5 another sensor
6 measuring channel
7 electronic unit
8 first processor
9 AD converter
10 range switch
11 reset function
12 start/stop function
13 power generation system, energy storage unit
14 first telemetry unit
15 first antenna
15.1 . . . 15.4 individual antennas
16 telemetry data
17 tool
18 tool holder
19 shaft
20 work space
21 base station
22 second antenna
23 connection
24 second telemetry unit
25 data processing unit
26 second processor
27 user
28 controller
29 evaluation unit
30 memory unit
31 housing

The invention claimed is:
1. A device for telemetric transmission of measurement data in a defined work space between a moving system and a stationary agent operating in the defined work space, the device comprising:
a measurement unit configured for generating measuring signals and fixedly attached to the moving system, the measurement unit including an electronic unit, a first processor, a sensor, and a measuring channel connected to the sensor;

a base station configured for receiving measuring signals from the measurement unit, wherein the base station remains within the defined work space;

the sensor is configured for acquiring measuring signals for telemetric transmission of measurement data to the base station;

wherein the first processor is configured for converting the measuring signals into measurement data;

wherein the electronic unit of the measurement unit having a first telemetry unit and a first antenna for transmitting measured data and for receiving configuration and control data;

wherein the base station includes a data processing unit, a second antenna and a second telemetry unit for receiving the measurement data and for transmitting the configuration and control data;

wherein one of the first antenna and the second antenna is a linearly polarized antenna and the other of the first antenna and the second antenna is a circularly polarized antenna; and wherein each telemetry unit is configured so that when a relative disposition between the two antennas changes during movement of the moving system so as to halve the maximum signal strength, then the telemetry unit of the transmitting antenna doubles the power of the transmitting antenna so as to negate loss in signal strength created by the change in relative disposition between the two antennas.

2. The device according to claim 1, wherein the measurement unit comprises at least one sensor, said sensor being a force, pressure, torque, feed force, bending moment, strain, vibration, acceleration and/or temperature sensor.

3. The device according to claim 1, wherein at least one measuring channel is provided for processing measuring signals from at least one of the following sensors: piezoelectric sensors, piezoresistive sensors, strain gauges and thermocouples.

4. The device according to claim 1, wherein the moving system is one of the following: a rotating tool, a turbine, a shaft, a roller, a wheel of a vehicle or a robot.

5. The device according to claim 1, wherein the two telemetry units are transmitters and receivers of far field telemetry in the range between 400 MHz and 700 GHz, inclusive.

6. The device according to claim 1, wherein each measuring channel of the measurement unit comprises an AD converter for digitizing the measuring signals.

7. The device according to claim 1, wherein at least one measuring channel of the measurement unit comprises a range switch for adjusting the measuring range wherein each range switch can be configured from the base station by telemetry.

8. The device according to claim 1, wherein at least one measuring channel of the measurement unit comprises a reset function for resetting the measuring channel and wherein all functions are controlled from the base station by telemetry.

9. The device according to claim 1, wherein for powering the electronic unit and the first telemetry unit the measurement unit comprises a power generation system.

10. The device according to claim 9, wherein the power generation unit generates power from the subjection of the measurement unit to one of: movement or a temperature difference.

11. The device according to claim 1, wherein the data processing unit comprises a second processor for analyzing the measurement data and for telemetric evaluation, configuration, operation and control of the measurement unit.

12. The device according to claim 1, wherein the data processing unit comprises at least one interface to a user, a controller, an evaluation unit and a memory unit.

13. The device according to claim 1, wherein the measuring channel of the measurement unit includes a start/stop function for starting and stopping a measurement and wherein the base station is configured to control all functions of the measuring channel by telemetry.

14. The device according to claim 1, wherein for powering the electronic unit and the first telemetry unit the measurement unit includes an energy storage unit.

15. The device according to claim 14, wherein the energy storage unit of the measurement unit receives energy transmitted by means of telemetry.

* * * * *